(12) United States Patent
Takahashi

(10) Patent No.: US 10,047,704 B2
(45) Date of Patent: Aug. 14, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Daishi Takahashi, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/069,000

(22) Filed: Mar. 14, 2016

(65) Prior Publication Data

US 2016/0333829 A1    Nov. 17, 2016

(30) Foreign Application Priority Data

May 13, 2015   (JP) .................................. 2015-098495

(51) Int. Cl.
*F02M 26/33* (2016.01)
*F01P 3/02* (2006.01)
(Continued)

(52) U.S. Cl.
CPC .............. *F02M 26/33* (2016.02); *F01P 3/02* (2013.01); *F01P 7/16* (2013.01); *F02D 41/005* (2013.01);
(Continued)

(58) Field of Classification Search
CPC ........ F02M 26/33; F02M 26/28; F02M 26/30; F02M 26/22; F02M 26/24; F02M 26/23;
(Continued)

(56) References Cited

U.S. PATENT DOCUMENTS 4,164,206 A    8/1979  Toelle
5,924,412 A *  7/1999  Suzuki ...................... F01P 3/02
                                                    123/41.08
(Continued)

FOREIGN PATENT DOCUMENTS

DE   11 2011 105 087 T5    7/2014
JP       62-143032 U1 *    9/1987
(Continued)

OTHER PUBLICATIONS

JP 62-143032 U1—English Translation.*
JP 2014141891 A—English Translation.*

*Primary Examiner* — Joseph Dallo
*Assistant Examiner* — Scott A Reinbold
(74) *Attorney, Agent, or Firm* — Hunton Andrews Kurth LLP

(57) ABSTRACT

An EGR device is operated and EGR is executed, when a temperature of a first cooling water that cools a cylinder block and a cylinder head is higher than an EGR allowable temperature, and a working point of the internal combustion engine that is fixed by a load and an engine speed is in an EGR execution region. The EGR execution region is variable with respect to a temperature of the second cooling water (the temperature of the second cooling water is lower than the first cooling water) that cools the intake port, and the EGR execution region is narrowed to a high load side in a case where the temperature of the second cooling water is lower than a threshold value temperature, as compared with a case where the temperature of the second cooling water is higher than the threshold value temperature.

4 Claims, 10 Drawing Sheets

(51) Int. Cl.
*F02D 41/00* (2006.01)
*F02D 41/26* (2006.01)
*F01P 7/16* (2006.01)
*F02D 41/04* (2006.01)
*F02D 41/06* (2006.01)
*F02D 41/24* (2006.01)
*F02M 26/28* (2016.01)
*F02M 26/30* (2016.01)

(52) U.S. Cl.
CPC ....... *F02D 41/0077* (2013.01); *F02D 41/045* (2013.01); *F02D 41/068* (2013.01); *F02D 41/2422* (2013.01); *F02D 41/26* (2013.01); *F01P 2003/021* (2013.01); *F01P 2003/024* (2013.01); *F02D 2200/0404* (2013.01); *F02M 26/28* (2016.02); *F02M 26/30* (2016.02); *Y02T 10/47* (2013.01)

(58) Field of Classification Search
CPC ...... F02M 26/25; F02M 26/49; F02D 41/045; F02D 41/068; F02D 41/2422; F02D 41/005; F02D 41/26; F02D 41/0077; F02D 2200/0404; F02D 41/0065; F02D 2041/0067; F02D 41/007; F02D 41/0072; F01P 3/02; F01P 2003/021; F01P 2003/024; F01P 7/165; F01P 7/16–7/167; Y02T 10/47; Y02T 10/26
USPC ....................................................... 701/108
See application file for complete search history.

(56) References Cited

U.S. PATENT DOCUMENTS

| | | | |
|---|---|---|---|
| 9,051,901 B2* | 6/2015 | Rumpsa | F02D 21/08 |
| 9,611,811 B2* | 4/2017 | Ohashi | F02D 41/0065 |
| 9,638,120 B2* | 5/2017 | Okada | F02D 41/0065 |
| 2013/0019848 A1 | 1/2013 | Noguchi | |
| 2014/0283765 A1* | 9/2014 | Naito | F01P 3/12 123/41.09 |
| 2015/0027387 A1 | 1/2015 | Ohashi et al. | |
| 2016/0326943 A1* | 11/2016 | Kimura | F01P 7/167 |
| 2016/0356256 A1* | 12/2016 | Tofukuji | F02P 5/152 |

FOREIGN PATENT DOCUMENTS

| | | | | |
|---|---|---|---|---|
| JP | H08-265831 A | 10/1996 | | |
| JP | H10-110654 A | 4/1998 | | |
| JP | 2014-141891 A | 8/2014 | | |
| JP | 2014141891 A | * 8/2014 | ............. | F02M 26/33 |

\* cited by examiner

CONTROL DEVICE FOR INTERNAL COMBUSTION ENGINE

CROSS-REFERENCE TO RELATED APPLICATION

The present application claims priority to Japanese Patent Application No. 2015-098495 filed on May 13, 2015, which is incorporated herein by reference in its entirety.

FIELD

The present application relates to a control device for an internal combustion engine, and particularly relates to a control device for an internal combustion engine including two cooling water circulation systems in which temperatures of cooling waters are different from each other and an EGR device.

BACKGROUND

An EGR cooler that is equipped in an EGR device is provided in a circulation system for a cooling water that cools the cylinder block and the cylinder head of an internal combustion engine, and is configured to cool the EGR gas by heat exchange of the cooling water and the EGR gas. Since the temperature of the cooling water is low at the time of a cold start of an internal combustion engine, there is the fear that the EGR gas is excessively cooled and condensed water is generated inside the EGR cooler. When the condensed water is taken into the combustion chamber of the internal combustion engine, the condensed water makes combustion unstable and degrades operability of the internal combustion engine.

The art disclosed in Patent Literature 1 as follows restrains generation of the condensed water in an EGR cooler by restricting the flow rate of the cooling water which flows into the EGR cooler based on the operating state of the internal combustion engine.

[Patent Literature 1] Japanese Patent Laid-Open No. 2014-141891
[Patent Literature 2] Japanese Patent Laid-Open No. H10-110654

SUMMARY

The inventor relating to the present patent application is conducting a study of installing two cooling water circulation systems in an internal combustion engine. Specifically, the inventor is conducting a study of installing a first cooling water circulation system that cools a whole of the cylinder block and the cylinder head, and a second cooling water circulation system that locally cools the intake port of the cylinder head, and causing a cooling water having a lower temperature than a cooling water that flows in the first cooling water circulation system to flow into the second cooling water circulation system. According to the configuration, the entire internal combustion engine is not excessively cooled, and cooling can be locally increased by being limited to the intake port. Therefore, according to the configuration, it is expected that the temperature of the intake air is reduced without increasing friction, occurrence of abnormal combustion can be effectively restrained, and charging efficiency of the intake air can be also enhanced.

However, the above described art under study (the art is not known to public at the point of time of filing of the present patent application) has a problem to be solved. Since an exhaust gas temperature is reduced under a low load, the temperature of the EGR gas which is recirculated into the intake passage is also reduced. Further, since the flow rate of the EGR gas is reduced under a low load, the cooling efficiency of the EGR cooler is increased, and the effect thereof causes further reduction in the temperature of the EGR gas. That is, the EGR gas has a low temperature under a low load, and in the above described art under study, the low-temperature EGR gas is further cooled in the intake port. Consequently, depending on the temperature of the cooling water that flows in the second cooling water circulation system, condensed water is likely to be generated in the intake port.

The present application is made in the light of the aforementioned problem, and provides a control device for an internal combustion engine that can restrain generation of condensed water in an intake port by excessive cooling of EGR gas.

A control device for an internal combustion engine according to the present application is suitable for an internal combustion engine including two cooling water circulation systems in which temperatures of cooling waters are different from each other, and an EGR device that recirculates exhaust gas (EGR gas) into an intake passage. The two cooling water circulation systems are constituted of a first cooling water circulation system that cools a cylinder block and a cylinder head by a first cooling water, and a second cooling water circulation system that cools an intake port that is formed in the cylinder head by a second cooling water having a lower temperature than the first cooling water. The EGR device may include an EGR cooler, preferably, an EGR cooler that cools EGR gas by the first cooling water.

The control device for an internal combustion engine includes processor unit configured to operate the EGR device and execute EGR, and to decrease an EGR amount in accordance with a temperature of the second cooling water. In detail, the processor unit is configured to execute EGR under conditions that a temperature of the first cooling water is higher than an EGR allowable temperature, and a working point of the internal combustion engine that is fixed by a load and an engine speed is in an EGR execution region. Further, The processor unit is configured to decrease an EGR amount in a predetermined region at a low load side in the EGR execution region in a case where the temperature of the second cooling water is lower than a threshold value temperature, as compared with a case where the temperature of the second cooling water is higher than the threshold value temperature.

According to the control device configured as above, even when the temperature of the first cooling water is higher than the EGR allowable temperature, the EGR amount is decreased in the predetermined region at the low load side where the EGR gas has a low temperature in a case where the temperature of the second cooling water which cools the intake port is lower than the threshold value temperature, as compared with the case where the temperature of the second cooling water is higher than the threshold value temperature. Thereby, generation of the condensed water by the low-temperature EGR gas being further cooled in the intake port can be restrained. Decreasing the EGR amount also includes making the EGR amount zero. If the EGR amount is made zero, the low-temperature EGR gas is avoided from flowing into the intake port and being further cooled, and therefore, generation of the condensed water in the intake port can be reliably restrained.

In the above described configuration, the processor unit may be configured to determine an operation amount of the EGR device, by using a first map and a second map in which an operation amount of the EGR device is related with the load and the engine speed in the EGR execution region. The second map is set so that the EGR amount in the predetermined region at the low load side where the EGR gas has a low temperature is smaller as compared with the first map. In this case, the processor unit may be configured to operate the EGR device based on the first map when the temperature of the second cooling water is higher than the threshold value temperature, and to operate the EGR device based on the second map when the temperature of the second cooling water is equal to or lower than the threshold value temperature. According to the configuration like this, the map for setting the operation amount of the EGR device is switched in accordance with the temperature of the second cooling water, and the operation amount of the EGR device which is suitable for not only the working point of the internal combustion engine but also the temperature of the second cooling water is set based on the map. The working point of the internal combustion engine may be a present working point, or may be a future working point (for example, a working point on a next control cycle) that is predicted from an accelerator opening degree or the like.

The processor unit may be further configured to control the temperature of the second cooling water in accordance with a load. The processor unit may be, specifically, configured to control the temperature of the second cooling water to a temperature lower than the threshold value temperature when the load of the internal combustion engine is higher than a predetermined threshold value load, and control the temperature of the second cooling water to a temperature higher than the threshold value temperature when the load of the internal combustion engine is lower than the threshold value load. That is, in this case, the operation region of the internal combustion engine is divided into a low water temperature control region with a relatively high load where the temperature of the second cooling water is controlled to be lower than the threshold value temperature, and a high water temperature control region with a relatively low load where the temperature of the second cooling water is controlled to be higher than the threshold value temperature, with the threshold value load as a boundary. The threshold value load may be included in either the low water temperature control region or the high water temperature control region. According to the configuration like this, in the low water temperature control region with a relatively high load, cooling of the intake port is increased and generation of abnormal combustion can be effectively restrained, whereas in the high water temperature control region with a relatively low load, cooling of the intake port is decreased and generation of the condensed water in the intake port can be restrained.

In the above case, the threshold value load which divides the operation region of the internal combustion engine into the low water temperature control region and the high water temperature control region may be equal to an upper limit load of the predetermined region (the operation region where the EGR amount is decreased when the water temperature of the second cooling water is lower than the threshold value temperature). By the configuration like this, the temperature of the second cooling water can be restrained from being lower than the threshold value temperature in the operation region where condensed water is readily generated.

If the EGR device includes the EGR cooler, the processor unit may be further configured to reduce a flow rate of the first cooling water which flows in the EGR cooler when the temperature of the second cooling water is lower than the threshold value temperature. By the configuration like this, the temperature of the EGR gas can be increased while the temperature of the second cooling water is lower than the threshold value temperature, and therefore, generation of condensed water in the intake port due to a delay in increase of the temperature of the second cooling water can be restrained.

As described above, according to the control device for an internal combustion engine according to the present application, the EGR amount in the predetermined region at the low load side in the EGR execution region is decreased when the temperature of the second cooling water which cools the intake port is lower than the threshold value temperature, and therefore, generation of condensed water in the intake port by cooling of the EGR gas can be restrained.

DESCRIPTION OF EMBODIMENTS

Hereinafter, an embodiment of the present application will be described with reference to the drawings. Note that when the numerals of the numbers, the quantities, the amounts, the ranges and the like of the respective elements are mentioned in the embodiment shown as follows, the present application is not limited to the mentioned numerals unless specially explicitly described otherwise, or unless the application is explicitly specified by the numerals theoretically. Further, structures, steps and the like that are described in the embodiment shown as follows are not always indispensable to the present application unless specially explicitly shown otherwise, or unless the application is explicitly specified by them theoretically.

1. System Configuration of Internal Combustion Engine

Figure 1:
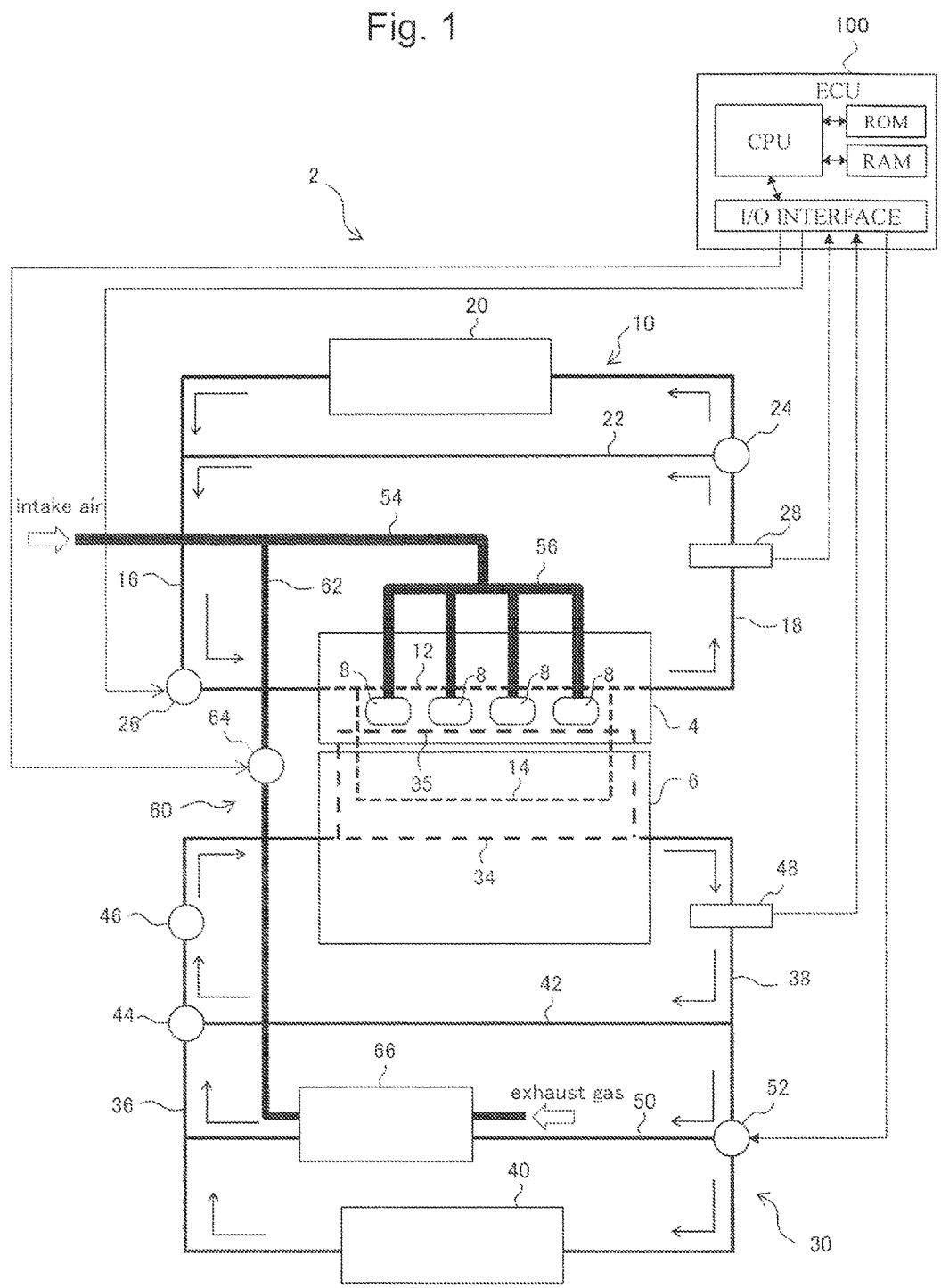
FIG. 1 is a diagram schematically showing a system configuration of an internal combustion engine of an embodiment.

FIG. 1 is a diagram schematically showing a system configuration of an internal combustion engine according to the present embodiment. An internal combustion engine (hereinafter, simply referred to as an engine) 2 of the present embodiment includes an EGR device 60 that recirculates exhaust gas into an intake passage 54. The EGR device 60 includes an EGR passage 62 that connects the intake passage 54 and an exhaust passage not illustrated, a water-cooling type EGR cooler 66 that is provided in the EGR passage 62, and an EGR valve 64 that is provided downstream (a side of the intake passage 54) of the EGR cooler 66 in the EGR passage 62. A cooling water that cools the engine 2 flows in the EGR cooler 66, and heat exchange is performed between recirculated exhaust gas (EGR gas) and the cooling water.

The engine 2 includes two cooling water circulation systems 10 and 30 that supply cooling waters to the engine 2. The cooling water is supplied to both a cylinder block 6 and a cylinder head 4 of the engine 2. The two cooling water circulation systems 10 and 30 are both independent closed loops, and temperatures of the cooling waters which are circulated can be made to differ from each other. Hereinafter, the cooling water circulation system 10 in which a relatively low-temperature cooling water circulates will be called an LT cooling water circulation system, and the cooling water circulation system 30 in which a relatively high-temperature cooling water circulates will be called an HT cooling water circulation system. Further, the cooling water that circulates in the LT cooling water circulation system 10 will be called an LT cooling water, and the cooling water that circulates in the HT cooling water circulation system 30 will be called an HT cooling water. Note that LT is an abbreviation of Low Temperature, and HT is an abbreviation of High Temperature.

The LT cooling water circulation system 10 includes an in-head LT cooling water channel 12 that is formed inside the cylinder head 4, and an in-block LT cooling water channel 14 that is formed inside the cylinder block 6. The in-head LT cooling water channel 12 is provided in vicinities of intake ports 8. In FIG. 1, four intake ports 8 corresponding to four cylinders are drawn as an example. The respective intake ports 8 are connected to the intake passage 54 by an intake manifold 56. The in-head LT cooling water channel 12 extends in a crank axis direction of the engine 2 along top surfaces of the intake ports 8 of the respective cylinders. The in-block LT cooling water channel 14 is provided to surround a part that especially contacts an intake air flow in a cylinder upper portion. Temperatures of the intake port 8 and the intake valve, and a wall surface temperature of the cylinder upper portion sensitively affect occurrence of knocking. Consequently, by predominantly cooling the intake port 8, the intake valve and the wall surface of the cylinder upper portion by the in-head LT cooling water channel 12 and the in-block LT cooling water channel 14, occurrence of knocking in a high load region can be effectively restrained. The in-head LT cooling water channel 12 and the in-block LT cooling water channel 14 are connected via openings that are formed on matching surfaces of the cylinder head 4 and the cylinder block 6.

In the cylinder head 4, a cooling water inlet and a cooling water outlet that communicate with the in-head LT cooling water channel 12 are formed. The cooling water inlet of the cylinder head 4 is connected to a cooling water outlet of an LT radiator 20 by a cooling water introduction pipe 16, and the cooling water outlet of the cylinder head 4 is connected to a cooling water inlet of the LT radiator 20 by a cooling water discharge pipe 18. The cooling water introduction pipe 16 and the cooling water discharge pipe 18 are connected by a bypass pipe 22 that bypasses the LT radiator 20. A three-way valve 24 is provided in a branch portion where the bypass pipe 22 branches from the cooling water discharge pipe 18. An electric water pump 26 for circulating the LT cooling water is provided downstream of a joint portion to the bypass pipe 22 in the cooling water introduction pipe 16. A discharge amount of the electric water pump 26 can be arbitrarily changed by regulating an output power of the motor. A temperature sensor 28 for measuring a temperature (a cooling water outlet temperature) of the LT cooling water that passes inside the engine 2 is attached upstream of the three-way valve 24 in the cooling water discharge pipe 18. In the present embodiment, the temperature of the LT cooling water means the cooling water outlet temperature which is measured by the temperature sensor 28.

In the LT cooling water circulation system 10, the electric water pump 26 is used, and therefore, the LT cooling water can be circulated and stopped irrespective of an operation of the engine 2. Further, the flow rate of the LT cooling water that circulates can be controlled by a drive duty that is given to the electric water pump 26. Further, a temperature of the LT cooling water which circulates in the LT cooling water circulation system 10 can be positively regulated by an operation of the three-way valve 24 or the electric water pump 26. Note that the three-way valve 24 and the bypass pipe 22 are not essential components in the LT cooling water circulation system 10, and can be omitted.

The HT cooling water circulation system 30 includes an in-block HT cooling water channel 34 that is formed inside the cylinder block 6, and an in-head HT cooling water channel 35 that is formed inside the cylinder head 4. Whereas the aforementioned in-block LT cooling water channel 14 is locally provided, the in-block HT cooling water channel 34 configures a main part of a water jacket that surrounds peripheries of the cylinders. The in-head HT cooling water channel 35 is provided in vicinities of exhaust ports to the vicinities of the intake ports. Intake air that flows in the intake port 8 is cooled slightly by the HT cooling water which flows in the in-head HT cooing water channel 35, and thereafter is cooled by the in-head LT cooling water channel 12 in which the lower-temperature LT cooling water flows. The in-head HT cooling water channel 35 and the in-block HT cooling water channel 34 are connected via openings that are formed in the matching surfaces of the cylinder head 4 and the cylinder block 6.

In the cylinder block 6, a cooling water inlet and a cooling water outlet that communicate with the in-block HT cooling water channel 34 are formed. The cooling water inlet of the cylinder block 6 is connected to a cooling water outlet of an HT radiator 40 by a cooling water introduction pipe 36, and the cooling water outlet of the cylinder block 6 is connected to a cooling water inlet of the HT radiator 40 by a cooling water discharge pipe 38. The cooling water introduction pipe 36 and the cooling water discharge pipe 38 are connected by a bypass pipe 42 that bypasses the HT radiator 40. A thermostat 44 is provided in a joint portion where the bypass pipe 42 joins the cooling water introduction pipe 36. A mechanical water pump 46 for circulating the HT cooling water is provided downstream of the thermostat 44 in the cooling water introduction pipe 36. The water pump 46 is coupled to the crankshaft of the engine 2 via a belt. A temperature sensor 48 for measuring a temperature (a cooling water outlet temperature) of the HT cooling water that passes inside the engine 2 is attached upstream of a branch portion to the bypass pipe 42 in the cooling water discharge pipe 38. In the present embodiment, the temperature of the HT cooling water means the cooling water outlet temperature which is measured by the temperature sensor 48.

In the HT cooling water circulation system 30, the water pump 46 is driven by the engine 2, and therefore the HT cooling water always circulates during an operation of the engine 2. The temperature of the cooling water which circulates in the HT cooling water circulation system 30 is automatically regulated by the thermostat 44.

Further, in the HT cooling water circulation system 30, an EGR cooler cooling pipe 50 that connects the cooling water introduction pipe 36 and the cooling water discharge pipe 38 is provided in parallel with the bypass pipe 42. The EGR cooler cooling pipe 50 passes through the EGR cooler 66. Heat exchange is performed between EGR gas that passes through the EGR cooler 66, and the HT cooling water which passes through the EGR cooler cooling pipe 50. In the branch portion where the EGR cooler cooling pipe 50 branches from the cooling water discharge pipe 38, a three-way valve 52 is provided. By an operation of the three-way valve 52, a flow rate of the HT cooling water which passes through the EGR cooler 66 is regulated, and a cooling ability of the EGR cooler 66 can be controlled.

The engine 2 is controlled by a control device 100. The control device 100 is an ECU (Electronic Control Unit) having at least an input/output interface, a ROM, a RAM and a CPU. The input/output interface is provided for taking in sensor signals from various sensors that are attached to the engine 2 and a vehicle, and outputting operation signals to actuators that are included by the engine 2. The ROM stores various control data including various control programs and maps for controlling the engine 2. The CPU reads and executes the control program from the ROM, and generates operation signals based on the sensor signals which are taken in.

Operations of the three-way valve 24 and the electric water pump 26 of the LT cooling water circulation system 10 are performed by the control device 100. The control device 100 operates the electric water pump 26 and controls the flow rate of the LT cooling water (hereinafter, called an LT flow rate), or operates the three-way valve 24 and controls a ratio of the LT cooling water which bypasses the LT radiator 20, and thereby properly regulates the temperature of the LT cooling water which flows in the in-head LT cooling water channel 12 and the in-block LT cooling water channel 14. Further, operations of the EGR valve 64 of the EGR device 60 and the three-way valve 52 are also performed by the control device 100.

In relation of the engine 2 which is configured as above and the invention according to CLAIMS, the HT cooling water circulation system 30 corresponds to a first cooling water circulation system, and the HT cooling water corresponds to a first cooling water. Further, the LT cooling water circulation system 10 corresponds to a second cooling water circulation system, and the LT cooling water corresponds to a second cooling water.

2. LT Flow Rate Control 2-1. LT Target Water Temperature Map

In order to cool respective essential parts of the cylinder head 4 and cylinder block 6 to proper temperatures, the control device 100 sets an LT target water temperature that is a target temperature of the LT cooling water which flows in the in-head LT cooling water channel 12 and the in-block LT cooling water channel 14, and controls an LT flow rate to realize the LT target water temperature. The ROM of the control device 100 stores an LT target water temperature map for setting the LT target water temperature. In the LT target water temperature map, the LT target water temperature is related with an operating state of the engine 2 which is specified by the engine speed and the engine load. In the present embodiment, as a specific parameter expressing a magnitude of the engine load, a charging efficiency is used.

Figure 2:
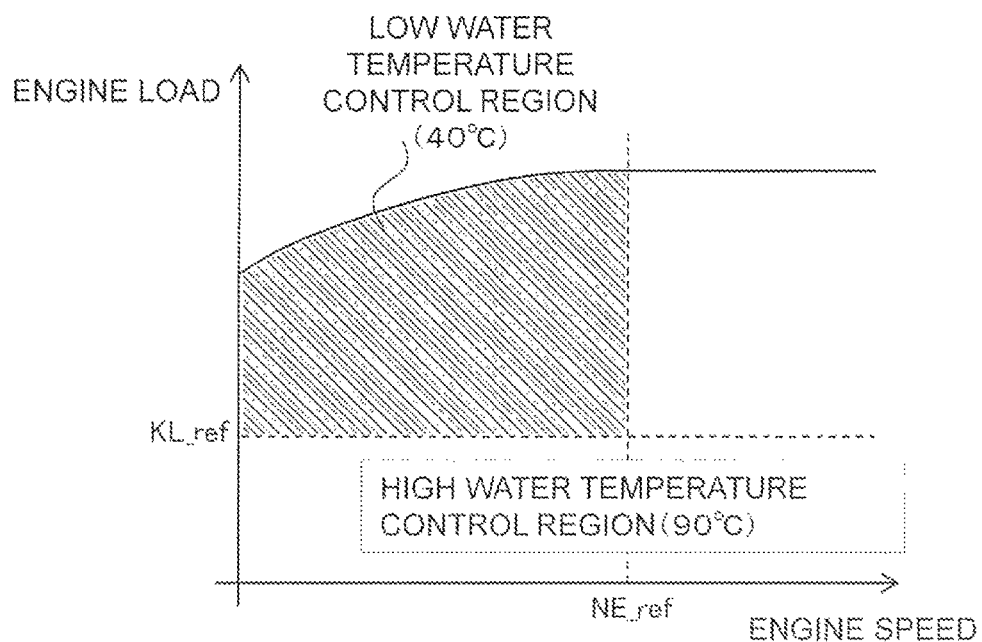
FIG. 2 is diagram showing an image of a map that relates an LT target water temperature with an engine speed and a load.

FIG. 2 is a diagram showing an image of the LT target water temperature map. In the LT target water temperature map, a low water temperature control region and a high water temperature control region are set. The low water temperature control region is set in an operation region with a high load and a low engine speed. In an example shown in FIG. 2, an operation region where the engine load is equal to or larger than a threshold value load "KL_ref", and the engine speed is equal to or lower than a threshold value engine speed "NE_ref" is set as the low water temperature control region. When a working point of the engine 2 which is defined by the engine load and the engine speed is within the low water temperature control region, the LT target water temperature is set at a predetermined low temperature (40° C. in this case). The LT target water temperature in the low water temperature control region is not limited to 40° C., but a temperature around 40° C. is a temperature suitable for restraining occurrence of knocking.

The high water temperature control region is set at an operation region other than the low water temperature control region. In the example shown in FIG. 2, the operation region where the engine load is lower than the threshold load "KL_ref", or the engine speed is higher than the threshold value engine speed "NE_ref" is set as the high water temperature control region. When the working point of the engine 2 is within the high water temperature control region, the LT target water temperature is set at a predetermined high temperature (90° C. in this case). The LT target water temperature in the high water temperature control region is not limited to 90° C. which is illustrated, but a temperature in a vicinity of 90° C. can prevent increase in port wet and instability of combustion due to excessive cooling, in the low load region and the high engine speed region where the temperature around the intake ports 8 tends to be low.

2-2. Control Flow of LT Flow Rate Control

Figure 3:
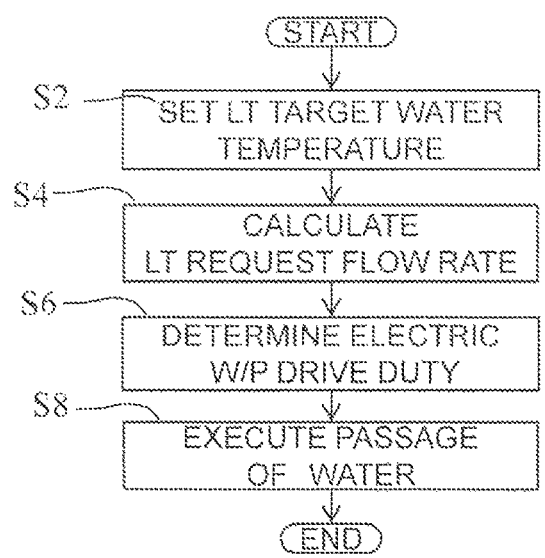
FIG. 3 is a flowchart showing a control flow of LT flow rate control.

FIG. 3 is a flowchart showing a control flow of the LT flow rate control by the control device 100. The control device 100 repeatedly executes a routine that is expressed by the flow like this on a predetermined control cycle corresponding to a number of clocks of the ECU. In the relation with the invention according to CLAIMS, a configuration in which the control device 100 executes the routine of the LT flow rate control corresponds to water temperature control means that is defined in the claim.

First, in step S2, the control device 100 refers to the aforementioned LT target water temperature map, and sets the LT target water temperature which is suitable for present engine speed and engine load.

Next, in step S4, the control device 100 calculates an LT request flow rate that is a request value of the LT flow rate, from the LT target water temperature which is set in step S2. In detail, the control device 100 refers to a map that is prepared and stored in advance and relates the LT target water temperature and the LT request flow rate, calculates a feed forward term of the LT request flow rate, and calculates a feedback term of the LT request flow rate by feedback control based on a difference between the LT target water temperature and a present temperature (an outlet temperature) of the LT cooling water which is measured by the temperature sensor 28.

Next, in step S6, the control device 100 determines the drive duty of the electric water pump 26 from the LT request flow rate which is determined in step S4. Finally, in step S8, the control device 100 operates the electric water pump 26 by the drive duty determined in step S6, and carries out flow of water to the in-head LT cooling water channel 12 and the in-block LT cooling water channel 14. Thereby, the LT flow rate changes, and the respective essential parts of the cylinder head 4 and the cylinder block 6 are cooled to proper temperatures.

However, if a valve that regulates an LT flow rate is provided in the LT cooling water circulation system 10, the LT flow rate also can be regulated by operating an opening degree of the valve in steps 6 and 8.

3. EGR Control 3-1. EGR Valve Opening Degree Map

The control device 100 controls an opening degree of the EGR valve 64 that is an operation amount of the EGR device 60 in order to obtain an EGR rate (a ratio of the EGR gas in the gas entering the cylinders) that is suitable for the operating state of the engine 2. In the ROM of the control device 100, two EGR valve opening degree maps for setting an opening degree of the EGR valve 64 are stored. In each of the EGR valve opening degree maps, the EGR valve opening degree is related with the operating state of the engine 2 which is determined by the engine speed and the engine load.

Figure 4:
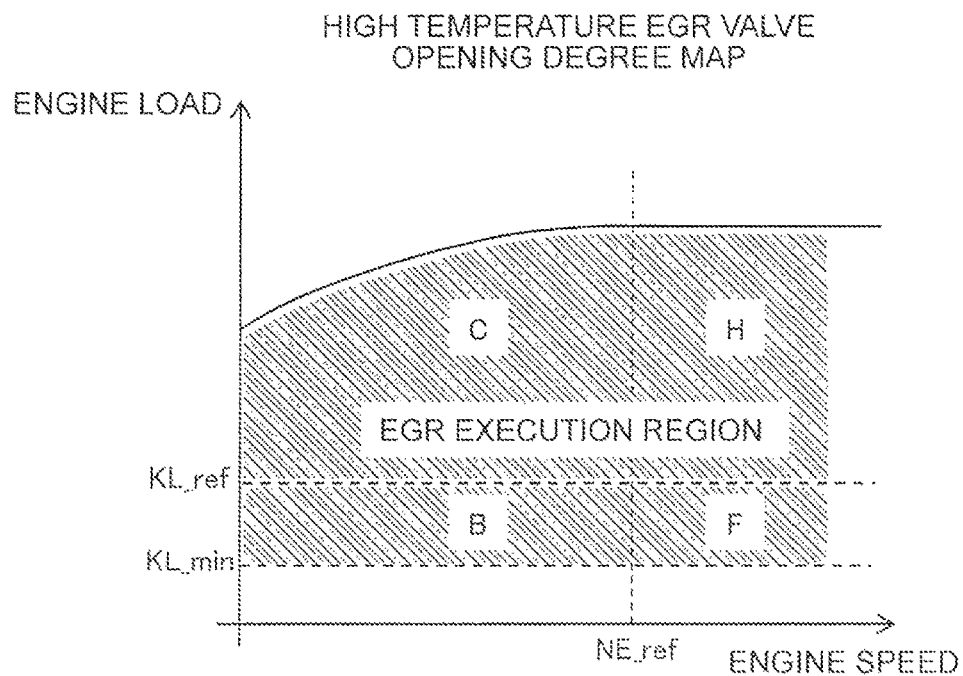
FIG. 4 is a diagram showing an execution region of EGR at a time of an LT water temperature being high.
Figure 5:
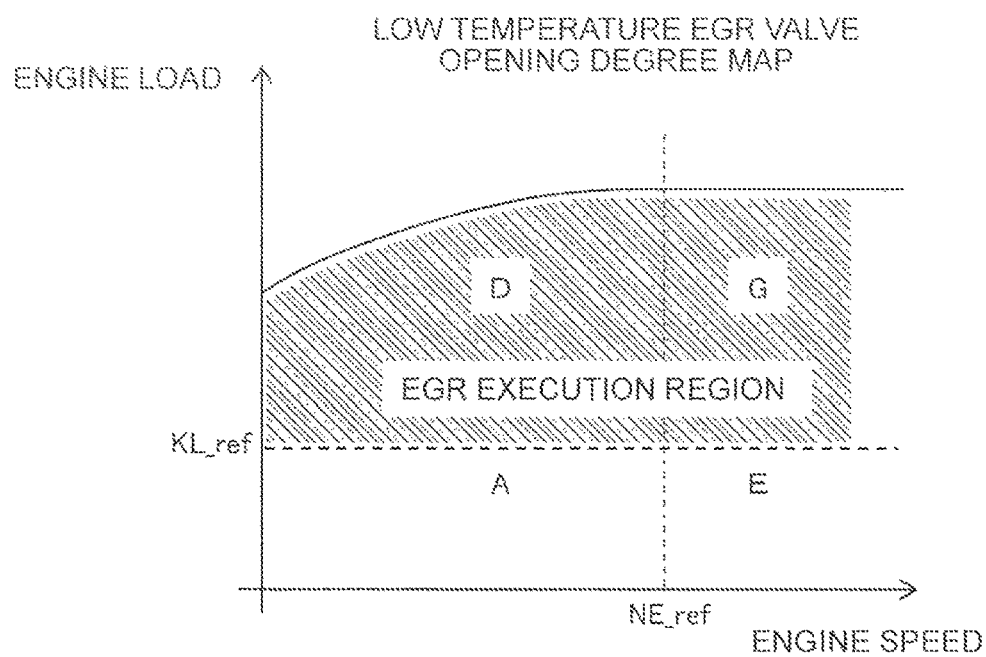
FIG. 5 is a diagram showing an execution region of EGR at a time of the LT water temperature being low.

The two EGR valve opening degree maps are properly used in accordance with the LT water temperature. When the LT water temperature is higher than a predetermined threshold value temperature, the control device 100 determines the opening degree of the EGR valve 64 in accordance with a map the image of which is shown in FIG. 4. When the LT water temperature is lower than the threshold value temperature, the control device 100 determines the opening degree of the EGR valve 64 in accordance with a map the image of which is shown in FIG. 5. The threshold value temperature is set at a temperature (60° C., for example) that is higher than the set temperature of the low water temperature control region in the LT target water temperature map, and is lower than the set temperature of the high water temperature control region. Hereinafter, the map the image of which is shown in FIG. 4 will be called a high temperature EGR valve opening degree map, and the map the image of which is shown in FIG. 5 will be called a low temperature EGR valve opening degree map. In the relation with the invention according to CLAIMS, the high temperature EGR valve opening degree map corresponds to a first map, and the low temperature EGR valve opening degree map corresponds to a second map.

In FIGS. 4 and 5, regions to which oblique line patterns are applied are EGR execution regions where EGR is executed. A difference between the high temperature EGR valve opening degree map shown in FIG. 4 and the low temperature EGR valve opening degree map shown in FIG. 5 lies in a range of the EGR execution region that is set. In the high temperature EGR valve opening degree map, the EGR execution region is set at an operation region where a load is equal to or higher than a predetermined lower limit load "KL_min". The lower limit load "KL_min" is smaller than the threshold value load "KL_ref" which defines the low water temperature control region in the LT target water temperature map. In relation to this, in the low temperature EGR valve opening degree map, the EGR execution region is set at an operation region where the load is equal to or higher than the threshold value load "KL_ref". That is, an operation region from the lower limit load "KL_min" to the threshold value load "KL_ref" is not set as the EGR execution region in the low temperature EGR valve opening degree map. When the low temperature EGR valve opening degree map is selected, the EGR amount is set as zero in the operation region from the lower limit load "KL_min" to the threshold value load "KL_ref". Setting of the EGR valve opening degree with respect to the engine speed and the engine load in the operation region where the load is equal to or higher than the threshold value load "KL_ref" is common in the two maps. In the relation with the invention according to CLAIMS, the operation region from the lower limit load "KL_min" to the threshold value load "KL_ref" corresponds to a predetermined region where the EGR amount is decreased.

In an operation region at a low load side from the threshold value load "KL_ref", the temperature of the EGR gas which is recirculated into the intake passage 54 drops. According to the LT target water temperature map, the operation region at the low load side from the threshold value load "KL_ref" is the high water temperature control region, and therefore, the LT target water temperature is set at a temperature higher than the threshold value temperature. The threshold value temperature is a temperature to be an indication of generation of condensed water in the intake port when the load is reduced and the temperature of the EGR gas drops. Consequently, if the LT water temperature is controlled to approach the LT target water temperature, condensed water is not generated in the intake port even if EGR is executed in the low load region where the temperature of the EGR gas drops. However, if EGR is executed in the low load region while the LT water temperature does not exceed the threshold temperature, there is the fear that condensed water is generated in the intake port since the temperature of the EGR gas is low. That is, depending on whether the LT water temperature is higher or lower than the threshold value temperature, it is determined whether execution of EGR in the low load region is proper or improper. The high temperature EGR valve opening degree map is a map that is selected when the LT water temperature is higher than the threshold value temperature and execution of EGR in the low load region is allowed, and the low temperature EGR valve opening degree map is a map that is selected when the LT water temperature is lower than the threshold value temperature and execution of EGR in the low load region is restricted.

3-2. Control Flow of EGR Control

Figure 6:
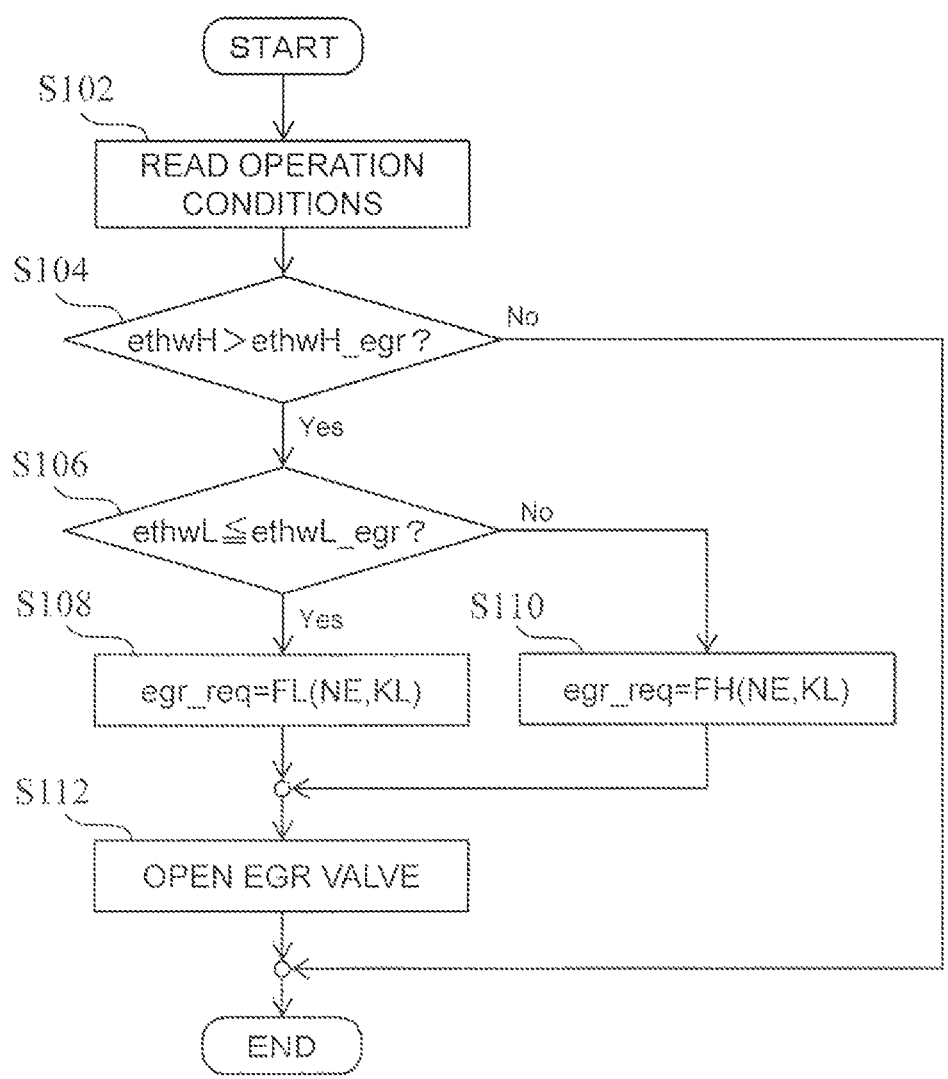
FIG. 6 is a flowchart showing a control flow of EGR control.

FIG. 6 is a flowchart showing a control flow of the EGR control by the control device 100. The aforementioned two EGR valve opening degree maps are used in determination of the opening degree of the EGR valve 64 in the EGR control. The control device 100 executes a routine that is expressed by the flow like this repeatedly on a predetermined control cycle corresponding to the number of clocks of the ECU.

The control device 100 firstly reads operation conditions of the engine 2 in step S102. The operation conditions which are read here include the engine load, the engine speed, the HT water temperature and the LT water temperature.

In step S104, the control device 100 determines whether or not an HT water temperature "ethwH" is higher than an EGR allowable temperature "ethwH_egr" that allows execution of EGR. The EGR allowable temperature "ethwH_egr" is a temperature (60° C., for example) at which a warm-up of the engine 2 is regarded as completed. When the HT water temperature "ethwH" does not reach the EGR allowable temperature "ethwH_egr", the control device 100 keeps the EGR valve 64 closed. That is, until the warm-up of the engine 2 is completed, the control device 100 does not execute EGR.

When the HT water temperature "ethwH" exceeds the EGR allowable temperature "ethwH_egr", the control device 100 performs determination in step S106 next. In step S106, the control device 100 determines whether or not the LT water temperature "ethwL" is equal to or lower than the aforementioned threshold value temperature "ethwL_egr".

When the LT water temperature "ethwL" is lower than the threshold value temperature "ethwL_egr", the control device 100 performs a process in step S108. In step S108, an opening degree "egr_req" of the EGR valve 64 is determined by using the low temperature EGR valve opening degree map. In detail, an engine speed "NE" and an engine load "KL" are inputted to the low temperature EGR valve opening degree map, and a map value "FL (NE, KL)" that is determined by these input values is read as the EGR valve opening degree "egr_req".

When the LT water temperature "ethwL" is equal to or higher than the threshold value temperature "ethwL_egr", the control device 100 performs a process in step S110. In step S110, the opening degree "egr_req" of the EGR valve 64 is determined by using the high temperature EGR valve opening degree map. In detail, the engine speed "NE" and the engine load "KL" are inputted to the high temperature EGR valve opening degree map, and a map value "FH (NE, KL)" that is determined by these input values is read as the EGR valve opening degree "egr_req".

When the EGR valve opening degree "egr_req" is determined in step S108 or S110, the control device 100 operates the EGR valve 64 in accordance with the EGR valve opening degree "egr_req" which is determined, in step S112. Thereby, the EGR valve 64 can be operated to an opening degree that is suitable for not only the engine load and the engine speed but also the temperature of the LT cooling water which cools the intake port 8.

In the relation with the invention according to CLAIMS, the configuration in which the control device 100 executes the aforementioned EGR control and performs determination based on the LT water temperature in step S106, and selects the process in step S108 or S110 corresponds to the processor unit that is defined in the claims.

3-3. Operation of System at Execution Time of EGR Control

Figure 7:
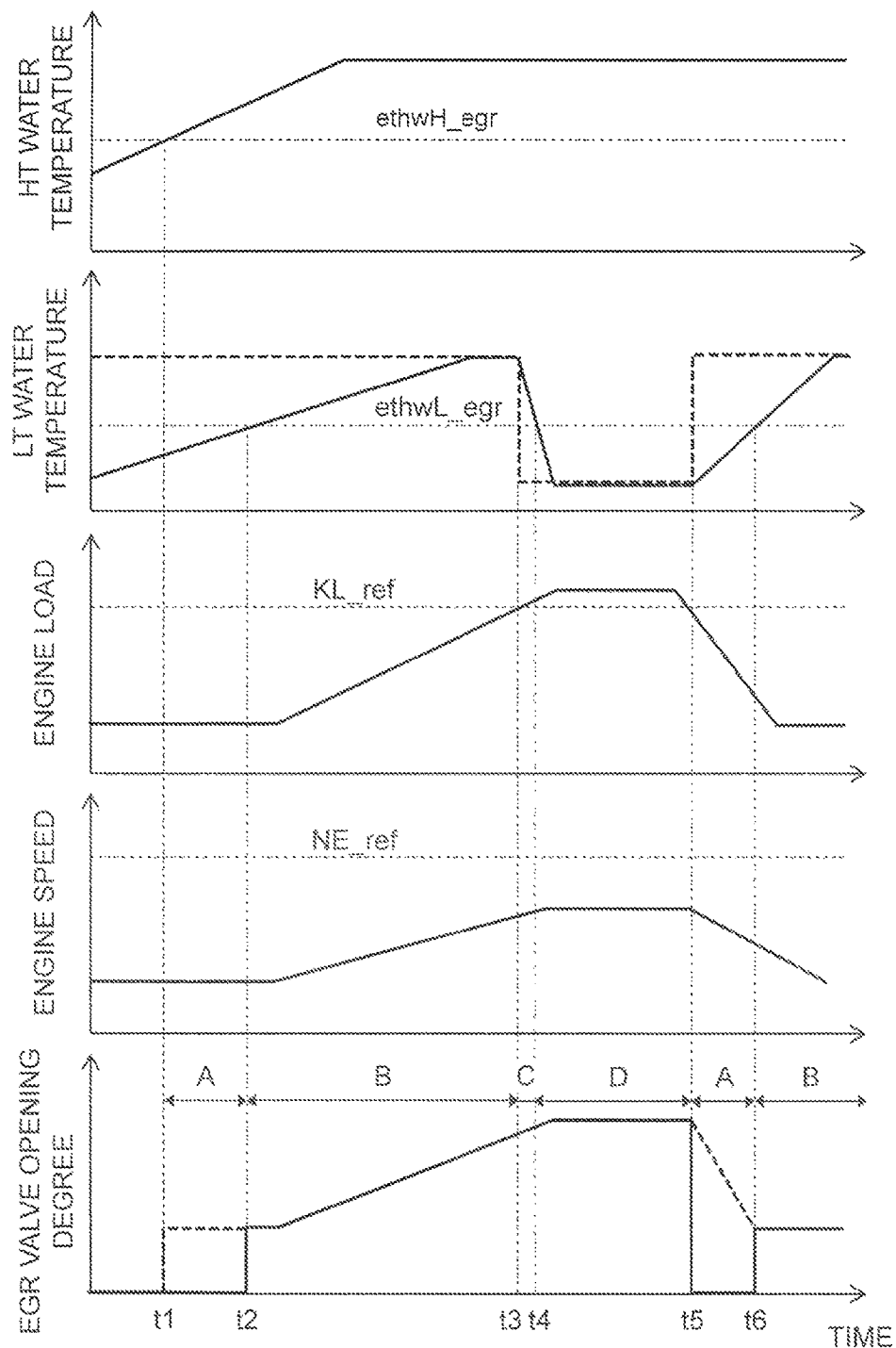
FIG. 7 is a time chart showing an operation of a system at a time of the EGR control being executed.
Figure 8:
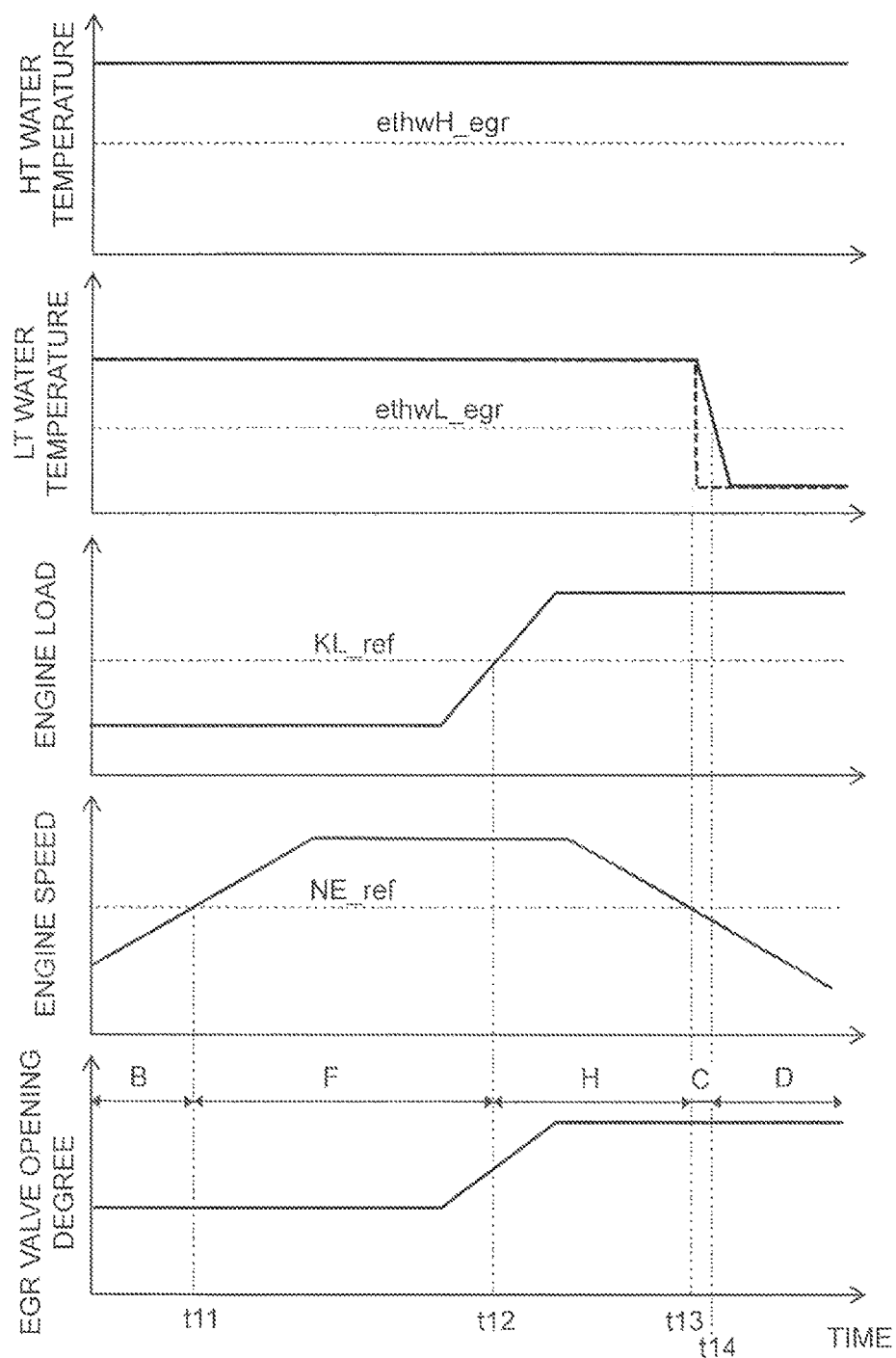
FIG. 8 is a time chart showing an operation of the system at the time of the EGR control being executed.

FIGS. 7 and 8 are time charts that show operations of the system at a time of the aforementioned EGR control being executed. A chart in a first tier in each of the drawings shows the HT water temperature. A chart in a second tier shows the LT water temperature (solid line) and the LT target water temperature (broken line). A chart in a third tier shows the engine load. A chart in a fourth tier shows the engine speed. A chart in a fifth tier shows the EGR valve opening degree (in detail, a target opening degree that is given to the EGR valve 64). Hereinafter, contents of the EGR control and an operation effect thereof will be specifically described with reference to FIG. 3 which shows the relation between the operation region of the engine 2 and the LT target water temperature and FIGS. 4 and 5 each showing the relation between the operation region of the engine 2 and the EGR execution region in combination.

The time chart in FIG. 7 shows the operation of the system in a case where after a cold start of the engine 2, the engine 2 accelerates from an idle state, and decelerates to the idle state after a steady operation for a while. After the cold start, the warm-up of the engine 2 advances, whereby the HT water temperature gradually increases, and at a time point t1, the HT water temperature exceeds the EGR allowable temperature "ethwH_egr". By the HT water temperature exceeding the EGR allowable temperature, EGR is executed immediately and the target opening degree is given to the EGR valve 64, when the LT water temperature is not taken into consideration. In the chart in the fifth tier, the EGR valve opening degree in a case where the LT water temperature is not taken into consideration is drawn by a broken line.

However, in the EGR control of the present embodiment, it is determined whether execution of EGR is proper or improper with the LT water temperature taken into consideration. The LT water temperature increases to the LT target water temperature which is determined based on the LT target water temperature map (refer to FIG. 3), but at the time point t1, the LT water temperature is lower than the threshold value temperature "ethwL_egr", and the LT water temperature becomes higher than the threshold value temperature after a time point t2. Consequently, in a period from the time point t1 to the time point t2, the low temperature EGR valve opening degree map (refer to FIG. 5) is used in determination of the EGR valve opening degree. Since the working point of the engine 2 in this period is located in an area A in the low temperature EGR valve opening degree map, the EGR is not executed, and the EGR valve 64 is kept in a closed state. Thereby, the EGR gas having a low temperature is avoided from flowing into the low-temperature intake port 8 and being further cooled.

After the time point t2, the LT water temperature exceeds the threshold value temperature, whereby the high temperature EGR valve opening degree map (refer to FIG. 4) is used in determination of the EGR valve opening degree. Since the working point of the engine 2 in a period until the engine load exceeds the threshold value load "KL_ref" is located in a region B in the high temperature EGR valve opening degree map, the EGR is executed, and the target opening degree which is suitable for the engine load and the engine speed is given to the EGR valve 64.

After a while, when the engine load exceeds the threshold value load "KL_ref" at a time point t3, the LT target water temperature which is determined from the LT target water temperature map is switched from a high temperature to a low temperature. By switching of the LT target water temperature, the LT water temperature rapidly drops. However, since there is a response delay in a change of the LT water temperature with respect to a change of the LT target water temperature, the LT water temperature becomes lower than the threshold value temperature at a time point t4 when a little time elapses after switching of the LT target water temperature. The working point of the engine 2 from the time point t3 to the time point t4 is located in a region C in the high temperature EGR valve opening degree map.

When the engine load is a high load exceeding the threshold value load, the LT water temperature is made lower than the threshold value temperature, whereby occurrence of abnormal combustion such as knocking in the high load low engine speed region is restrained. When the engine 2 starts deceleration in this state, the engine load is reduced, and the engine load falls below the threshold value load at a time point t5. The working point of the engine 2 from the time point t4 to the time point t5 is located in a region D in the low temperature EGR valve opening degree map.

When the engine load becomes lower than the threshold value load at the time point t5, the LT target water temperature which is determined based on the LT target water temperature map is switched to a high temperature from a low temperature. However, since there is a response delay in the change of the LT water temperature with respect to the change of the LT target water temperature, for a period after the engine load becomes lower than the threshold value load, a state continues, in which the engine load is lower than the threshold value load, and the LT water temperature is lower than the threshold value temperature. If the EGR valve opening degree is determined from the engine load and the engine speed without the LT water temperature taken into consideration in this period, the target opening degree is given to the EGR valve 64 and execution of the EGR is continued, as shown by the broken line in the chart in the fifth tier.

However, in the EGR control of the present embodiment, in a period until a time point t6 when the LT water temperature exceeds the threshold value temperature, the low temperature EGR valve opening degree map is continuously used in determination of the EGR valve opening degree. Since the working point of the engine 2 in this period is located in the region A in the low temperature EGR valve opening degree map, EGR is not executed and the EGR valve 64 is closed. Thereby, the low-temperature EGR gas is avoided from flowing into the low-temperature intake port 8 and being further cooled, and generation of condensed water in the intake port 8 is restrained.

When the LT water temperature exceeds the threshold value temperature at the time point t6, the map for use in determination of the EGR valve opening degree is switched from the low temperature EGR valve opening degree map to the high temperature EGR valve opening degree map. Since the working point of the engine 2 at the time point t6 and thereafter is located in the region B in the high temperature EGR valve opening degree map, EGR is executed, and the target opening degree suitable for the engine load and the engine speed is given to the EGR valve 64.

The time chart in FIG. 8 shows the operation of the system in a case where in a state in which a warm-up of the engine 2 is completed, the engine load is constant and the engine speed increases first, the engine speed is constant and the engine load increases next, and the engine load is constant and the engine speed is reduced.

The working point of the engine 2 until a time point t11 when the engine speed exceeds a threshold value engine speed "NE_ref" is located in the region B in the high temperature EGR valve opening degree map. The working point of the engine 2 from the time point T11 to a time point t12 when the engine load exceeds the threshold value load "KL_ref" is located in a region F in the high temperature EGR valve opening degree map. The working point of the engine 2 from the time point t12 until a time point t13 when the engine speed falls below the threshold value engine speed "NE_ref" is located in a region H in the high temperature EGR valve opening degree map.

The working point of the engine 2 in a period until the time point t13 is located in the high water temperature control region in the LT target water temperature map. However, when the engine speed falls below the threshold value engine speed, the working point of the engine 2 is located in the low water temperature control region in the LT target water temperature map. Thereby, the LT target water temperature which is determined based on the LT target water temperature map is switched from a high temperature to a low temperature. By switching of the LT target water temperature, the LT water temperature rapidly drops. However, since there is a response delay in the change of the LT water temperature with respect to the change of the LT target water temperature, the LT water temperature becomes lower than the threshold value temperature at a time point t14 when a little time elapses after switching of the LT target water temperature. The working point of the engine 2 from the time point t13 to the time point t14 is located in the region C in the high temperature EGR valve opening degree map. The working point of the engine 2 at the time point t14 and thereafter is located in the region D in the low temperature EGR valve opening degree map. When the working point of the engine 2 is in the high load low engine speed region, the LT water temperature is made lower than the threshold value temperature, whereby occurrence of abnormal combustion such as knocking is restrained.

4. Modification Example of EGR Control 4-1. Control Flow of Modification Example of EGR Control The operation effect which is obtained by the aforementioned EGR control can be also obtained by a modification example that will be described as follows if the high temperature EGR valve opening degree map (see FIG. 4) and the low temperature EGR valve opening degree map (see FIG. 5) in determination of the EGR valve opening degree. As shown in the time chart in FIG. 7 mentioned above, a situation in which EGR should not be executed occurs at a time of a cold start and a deceleration time from a high load to a low load. Of them, the problem at the time of a cold start is basically a problem that can occur at each trip, but the problem at the time of deceleration is a problem that can occur any number of times at each of decelerations in one trip. The modification example of the EGR control which will be described as follows is devised with the focus especially placed on excessive cooling of the EGR gas which can occur at the deceleration time from a high load to a low load.

Figure 9:
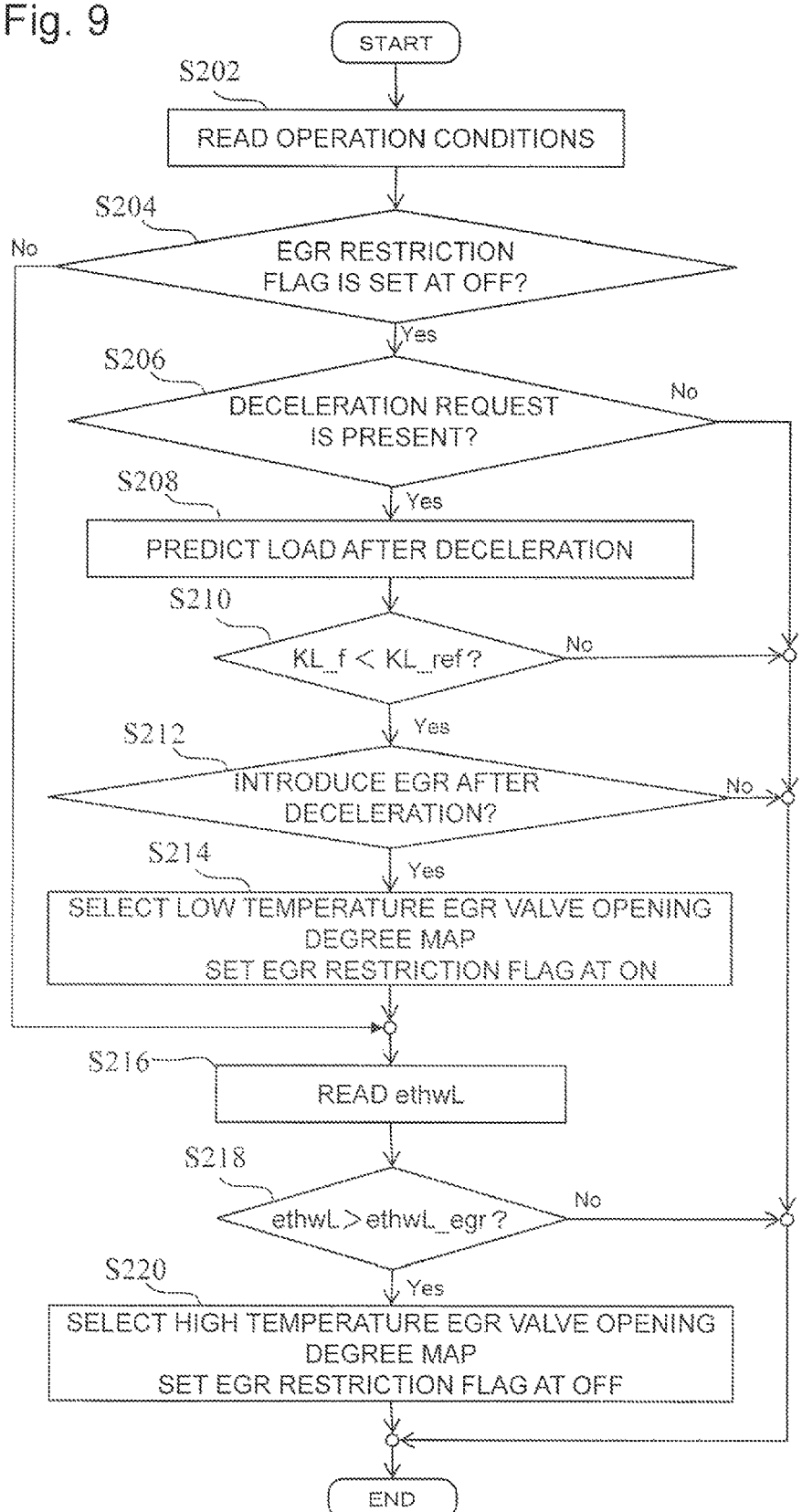
FIG. 9 is a flowchart showing a control flow of a modification example of the EGR control.

FIG. 9 is a flowchart showing a control flow of the modification example of the EGR control. When the control device 100 executes the modification example of the EGR control, the control device 100 repeatedly executes a routine that is expressed by the flow like this on a predetermined control cycle corresponding to the number of clocks of the ECU. The routine of the modification example is carried out on the precondition that the HT water temperature is higher than the EGR allowable temperature, that is, a warm-up of the engine 2 is completed.

First, in step S202, the control device 100 reads operation conditions of the engine 2. The operation conditions which are read here include the accelerator opening degree, and the engine speed.

In step S204, the control device 100 determines whether an EGR restriction flag is set at off. The EGR restriction flag is a flag that is set at on when restriction of EGR is performed, and is set at off when the restriction is cancelled.

When the EGR restriction flag is set at off, in step S206, the control device 100 determines presence or absence of a deceleration request to the engine 2 by a driver, from a change amount and a change speed of an accelerator opening degree (or a throttle opening degree). When the deceleration request is absent, the following processes are skipped and execution of EGR is continued.

When the deceleration request is present, the control device 100 calculates an engine load after a predetermined time period (for example, an engine load in the next control cycle, hereinafter, referred to as an engine prediction load) "KL_f" on the basis of the accelerator opening degree, in step S208.

Next, in step S210, the control device 100 determines whether the engine prediction load "KL_f" is smaller than the threshold value load "KL_ref". When the engine prediction load is not smaller than the threshold value load, EGR is executed in accordance with either the high temperature EGR valve opening degree map or the low temperature EGR valve opening degree map. Therefore, when the determination in step S210 is negative, the following processes are skipped, and execution of EGR is continued.

When the engine prediction load is smaller than the threshold value load, the control device 100 determines whether to introduce EGR after deceleration, in step S212. The determination is performed by confirming whether the working point which is fixed by the engine prediction load and the engine speed is in the EGR execution region which is defined by the high temperature EGR valve opening degree map. If EGR is not introduced after deceleration, the following processes are skipped, and execution of EGR is restricted.

When EGR is introduced after deceleration, the control device 100 selects the low temperature EGR valve opening degree map as the map for determining the EGR valve opening degree, in step S214. In the low temperature EGR valve opening degree map, EGR is not executed in the operation region at the low load side from the threshold value load, and therefore, the EGR valve 64 is closed by selection of the low temperature EGR valve opening degree map. At the same time, the EGR restriction flag is set at on.

Next, the control device 100 reads the LT water temperature "ethwL" in step S216. In step S218, the control device 100 determines whether the LT water temperature "ethwL" is higher than the threshold value temperature "ethwL_egr". The engine load becomes smaller than the threshold value load by deceleration, whereby the LT target water temperature which is determined based on the LT target water temperature map is switched from a low temperature to a high temperature. However, since there is a response delay in the change of the LT water temperature with respect to the change of the LT target water temperature, a time is required until the LT water temperature exceeds the threshold value temperature. In this time period, a result of the determination in step S218 becomes negative, and execution of EGR is continued to be restricted. Further, while the EGR restriction flag is set at on, the processes from step S206 to step S214 are skipped.

When the LT water temperature becomes higher than the threshold value temperature after a while, the control device 100 selects the high temperature EGR valve opening degree map as the map for determining the EGR valve opening degree in step S220. In the high temperature EGR valve opening degree map, EGR is also executed in the operation region at the low load side from the threshold value load, and therefore, the EGR valve 64 is opened by selection of the high temperature EGR valve opening degree map. At the same time, the EGR restriction flag is set at off.

Figure 10:
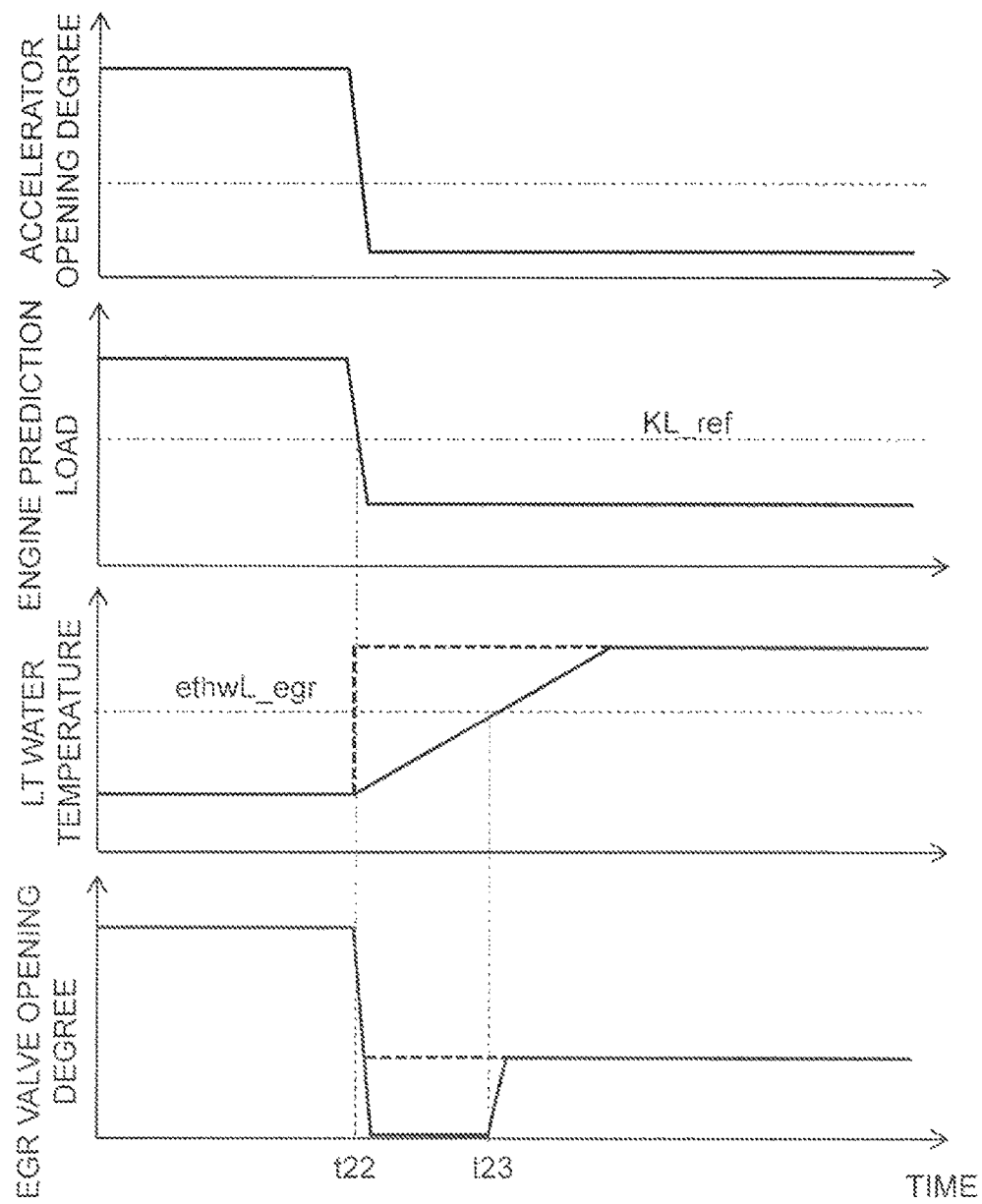
FIG. 10 is a time chart showing an operation of a system at a time of the modification example of the EGR control being executed.

4-2. Operation of System at Execution Time of Modification Example of EGR Control FIG. 10 is a time chart showing an operation of the system at a time of executing the modification example of the EGR control described above. A chart in a first tier in FIG. 10 shows the accelerator opening degree. A chart in a second tier shows the engine prediction load. A chart in a third tier shows the LT water temperature (solid line) and the LT target water temperature (broken line), and a chart in a fourth tier shows the EGR valve opening degree (in detail, the target opening degree to be given to the EGR valve 64). Hereinafter, contents of the modification example of the EGR control and an operational effect thereof will be specifically described.

The time chart in FIG. 10 shows the operation of the system in a case where an accelerator is rapidly closed from a state of being operated under a high load. The accelerator is rapidly closed, whereby the engine prediction load which is calculated from the accelerator opening degree is also decreased rapidly from a high load to a low load, and the engine prediction load falls below the threshold value load "KL_ref" at a time point t22.

When the engine prediction load becomes lower than the threshold value load at the time point t22, the LT target water temperature which is determined based on the LT target water temperature map is switched to a high temperature from a low temperature. However, since there is a response delay in the change of the LT water temperature with respect to the change of the LT target water temperature, for a period of time after the engine prediction load becomes lower than the threshold value load, a state continues, in which the engine prediction load is lower than the threshold value load and the LT water temperature is lower than the threshold value temperature "ethwL_egr". If the EGR valve opening degree is determined based on the engine load and the engine speed without the LT water temperature taken into consideration in this period of time, the target opening degree is given to the EGR valve 64 and execution of EGR is continued, as shown by the broken line in the chart in the fourth tier.

However, in the aforementioned modification example of the EGR control, in the period until a time point t23 when the LT water temperature exceeds the threshold value temperature, the low temperature EGR valve opening degree map is continuously used in determination of the EGR valve opening degree. Consequently, EGR is not executed and the EGR valve 64 is closed. Thereby, the low-temperature EGR gas is avoided from flowing to the low-temperature intake port 8 and being further cooled.

When the LT water temperature exceeds the threshold value temperature at the time point t23, the map for use in determination of the EGR valve opening degree is switched to the high temperature EGR valve opening degree map from the low-temperature EGR valve opening degree map. Thereby, EGR is executed, and the target opening degree which is suitable for the engine prediction load and the engine speed is given to the EGR valve 64.

As described above, according to the modification example of the EGR control of the present embodiment, by the common art to the EGR control of the present embodiment which uses the high temperature EGR valve opening degree map and the low temperature EGR valve opening degree map by switching, the EGR valve 64 can be operated to the opening degree which is suitable for not only the engine load and engine speed but also the temperature of the LT cooling water which cools the intake port 8. In the relation with the invention according to CLAIMS, a configuration in which the control device 100 executes the modification example of the EGR control described above and performs the processes and determinations from steps S214 to S218 corresponds to the processor unit that is defined in claims.

4-3. Control Flow of Second Modification Example of EGR Control

The aforementioned modification example can be carried out by being further modified as follows. The further modification example (a second modification example) has a feature of performing switching of the maps for use in determination of the EGR valve opening degree (switching to the high temperature EGR valve opening degree map from the low temperature EGR valve opening degree map) by a timer.

Figure 11:
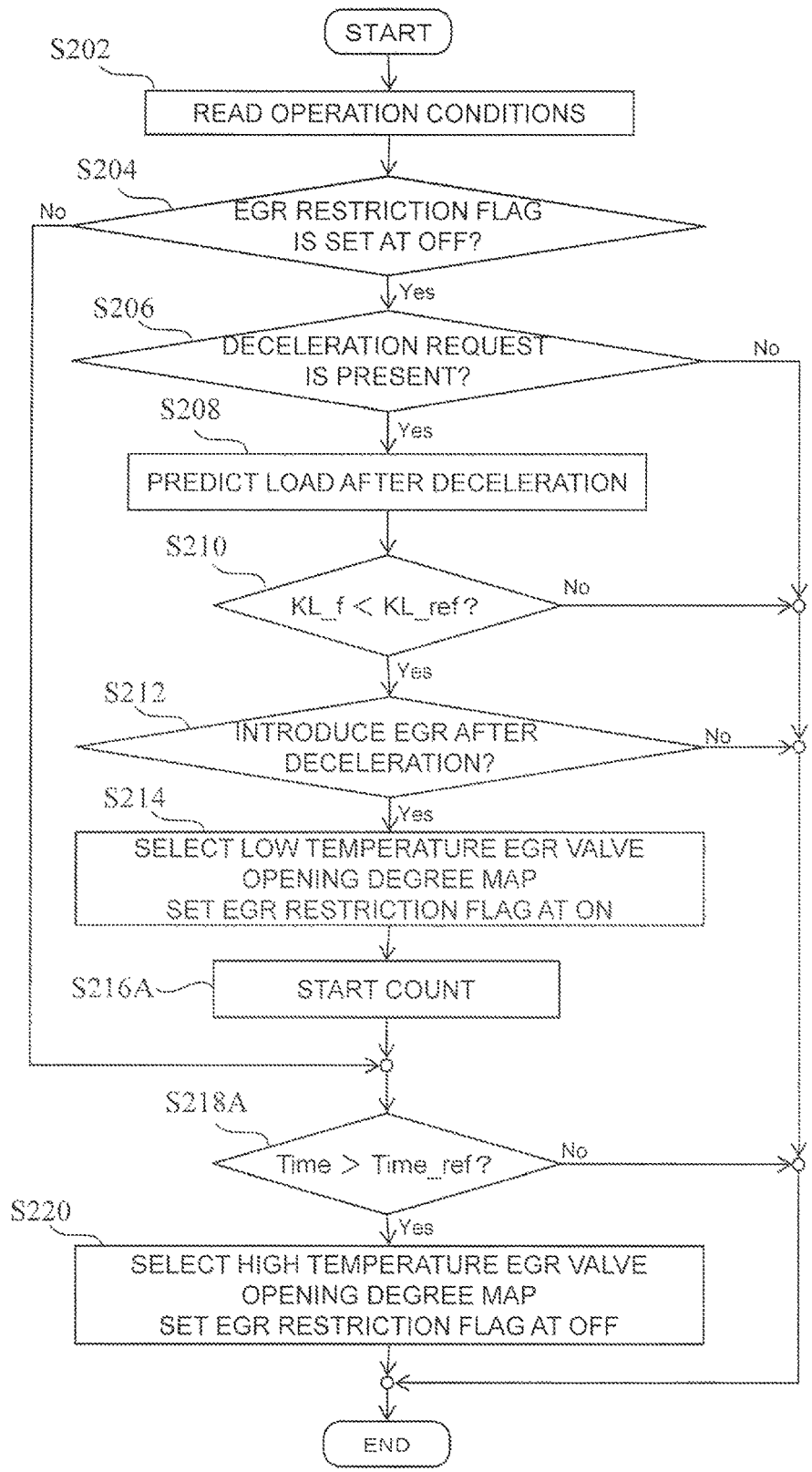
FIG. 11 is a flowchart showing a control flow of another modification example of the EGR control.

FIG. 11 is a flowchart showing a control flow of the second modification example of EGR control. In the control flow shown in FIG. 11, processes of the same contents as the control flow in the modification example shown in FIG. 9 are assigned with the same step numbers. Hereinafter, characteristic processes of the second modification example will be described.

According to the control flow shown in FIG. 11, the control device 100 performs a process in step S216A after the process in step S214. In step S216A, count is started by a timer of the control device 100. In step S214, the EGR valve 64 is closed by selection of the low temperature EGR valve opening degree map. Consequently, the count which is started in step S216A is count of an elapsed time after execution of EGR is restricted. The EGR restriction flag is set at on in step S214, whereby the processes from step S206 to step S216A are skipped until the EGR restriction flag is set at off again at the next time and the following times.

Next, in step S218A, the control device 100 determines whether a count value "Time" of the timer becomes larger than a threshold value time "Time_ref". The threshold value time is set based on an empirical value of a required time until the LT water temperature exceeds the threshold value temperature after the LT target water temperature is switched from a low temperature to a high temperature. That is, in the second modification example, it is not confirmed whether the LT water temperature actually exceeds the threshold value temperature, but it is estimated that the LT water temperature exceeds the threshold value temperature based on the count value of the timer.

When the count value of the timer becomes larger than the threshold value time, the control device 100 selects the high temperature EGR valve opening degree map as the map for determining the EGR valve opening degree, and sets the EGR restriction flag at off, in step S220. By selection of the high temperature EGR valve opening degree map, the EGR valve 64 is opened and EGR is executed.

5. Another Embodiment of EGR Control

In the aforementioned EGR control or modification examples thereof, the EGR valve 64 is closed so as not to execute EGR, when the LT water temperature is lower than the threshold value temperature, and the engine load is lower than the threshold value load. The EGR valve 64 is closed and the EGR amount is made zero, whereby generation of condensed water can be reliably restrained.

However, the choices of EGR control include decreasing the EGR amount to such an extent that the generation amount of the condensed water does not exceed an allowable range, that is, limiting EGR instead of executing no EGR. Specifically, in the case where the LT water temperature is lower than the threshold value temperature, the EGR amount is decreased by decreasing the opening degree of the EGR valve 64 in the operation region where the engine load is lower than the threshold value load, as compared with the case where the LT water temperature is higher than the threshold value temperature, whereby generation of condensed water may be limited to the allowable range.

More specifically, the EGR valve opening degree in the operation region to the threshold value load from a lower limit load in the low temperature EGR valve opening degree map is set at a smaller value than that in a setting in the high temperature EGR valve opening degree map, whereby the EGR amount may be decreased more than the EGR amount at the time of selecting the high temperature EGR valve opening degree map. In the relation with the invention according to CLAIMS, closing the EGR valve 64 and making the EGR amount zero is one mode of decreasing the EGR amount to restrain generation of condensed water in the intake port 8.

6. EGR Cooler Control

Figure 12:
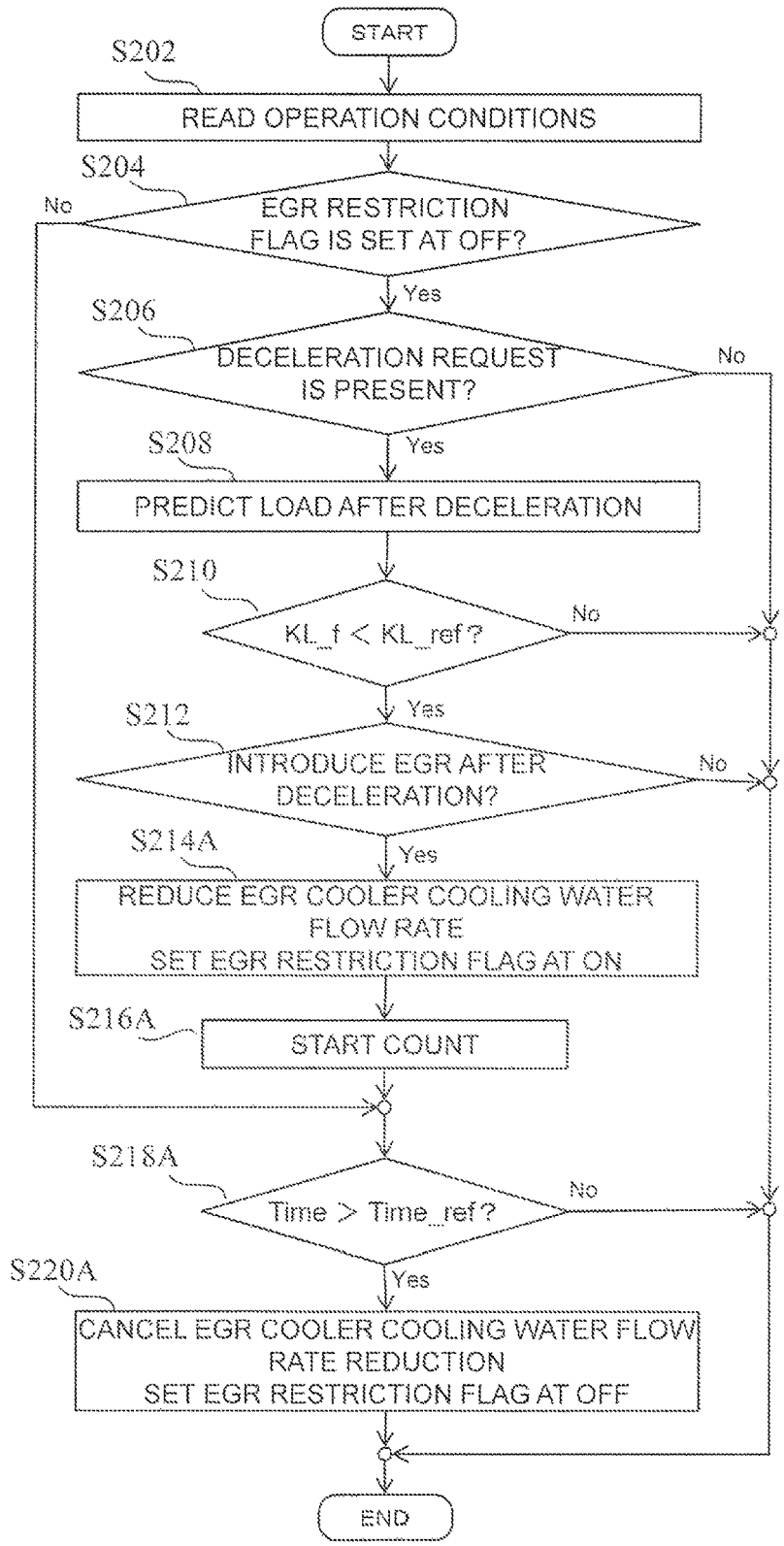
FIG. 12 is a flowchart showing a control flow of EGR cooler control.

When EGR is limited instead of being not executed, EGR cooler control that will be described as follows, in more detail, control of the flow rate of the HT cooling water flowing in the EGR cooler 66 is preferably performed in combination. FIG. 12 is a flowchart showing a control flow of the EGR cooler control. When the control device 100 executes the EGR cooler control, the control device 100 executes a routine expressed by the flow like this repeatedly on a predetermined control cycle corresponding to the number of clocks of the ECU. However, it is one of the choices, and is not essential control in the present embodiment that the control device 100 executes the EGR cooler control.

In the control flow of the EGR cooler control shown in FIG. 12, in most part of it, common processes to the control flow of the second modification example of the EGR control are performed. In the control flow shown in FIG. 12, processes of the same contents as in the control flow of the second modification example of the EGR control shown in FIG. 11 are assigned with the same step numbers. Hereinafter, characteristic processes of the EGR cooler control will be described.

According to the control flow shown in FIG. 12, when the determination result in step S212 is affirmative, that is, when EGR is introduced after deceleration, a process in step S214A is performed. In step S214A, the control device 100 operates the three-way valve 52 to reduce the flow rate of the HT cooling water which flows in the EGR cooler 66. Since heat exchange is performed between the EGR gas and the HT cooling water in the EGR cooler 66, if the flow rate of the cooling water which passes through the EGR cooler 66 decreases, the amount of heat that is taken from the EGR gas decreases, and reduction in the temperature of the EGR gas in the EGR cooler 66 becomes small. Further, in step S214A, the EGR restriction flag is set at on.

Next, in step S216A, the control device 100 starts count by the timer. The count which is started in step S216A is count of an elapsed time after reducing the flow rate of the HT cooling water which flows in the EGR cooler 66. The EGR restriction flag is set at on in step S214A, whereby at the next and following times, the processes from step S206 to step S216A are skipped until the EGR restriction flag is set at off again.

Next, in step S218A, the control device 100 determines whether the count value "Time" of the timer becomes larger than the threshold value time "Time_ref". The threshold value time is set based on an empirical value of a required time until the LT water temperature exceeds the threshold value temperature after the LT target water temperature is switched to a high temperature from a low temperature. In a period until the count value of the timer reaches the threshold value time, the flow rate of the HT cooling water which flows in the EGR cooler 66 is kept at a flow rate which is lower than usual. Thereby, cooling of the EGR gas by the HT cooling water is decreased, and the temperature of the EGR gas which flows in the intake port 8 can be increased.

When the count value of the timer becomes larger than the threshold value time, the control device 100 operates the three-way valve 52 again and cancels reduction of the flow rate of the HT cooling water which flows in the EGR cooler 66 in step S220A. At the same time, the control device 100 sets the EGR restriction flag at off.

By executing the EGR cooler control as above in combination with the EGR control or the modification examples thereof, generation of condensed water in the intake port 8 can be restrained while supply of the EGR gas is continued.

The invention claimed is:

1. A control device for an internal combustion engine including a first cooling water circulation system that cools a cylinder block and a cylinder head by a first cooling water, a second cooling water circulation system that cools an intake port that is formed in the cylinder head by a second cooling water having a lower temperature than the first cooling water, and an EGR device that recirculates exhaust gas into an intake passage, and a processor unit is configured to operate the EGR device and execute EGR, when a temperature of the first cooling water is higher than an EGR allowable temperature, and a working point of the internal combustion engine that is fixed by a load and an engine speed is in a first EGR execution region according to a first EGR map; and to decrease an EGR amount in a predetermined region in the EGR execution region existing below a threshold value load in a case where a temperature of the second cooling water is lower than a threshold value temperature wherein the first and second cooling water circulation systems are independent of each other.

2. The control device for an internal combustion engine according to claim 1, wherein the processor unit is further configured to determine an operation amount of the EGR device, by using a first map in which an operation amount of the EGR device is related with the load and the engine speed, and a second map in which the EGR amount in the predetermined region is set to be smaller as compared with the first map, to operate the EGR device based on the first map when the temperature of the second cooling water is higher than the threshold value temperature, and to operate the EGR device based on the second map when the temperature of the second cooling water is equal to or lower than the threshold value temperature.

3. The control device for an internal combustion engine according to claim 1, wherein the processor unit is further configured to control the temperature of the second cooling water to a temperature lower than the threshold value temperature when the load of the internal combustion engine is higher than a predetermined threshold value load, and to control the temperature of the second cooling water to a temperature higher than the threshold value temperature when the load of the internal combustion engine is lower than the threshold value load.

4. The control device for an internal combustion engine according to claim 1, wherein the EGR device comprises an EGR cooler that cools exhaust gas to be recirculated, by the first cooling water, and the processer unit is further configured to reduce a flow rate of the first cooling water which flows in the EGR cooler when the temperature of the second cooling water is lower than the threshold value temperature.

* * * * *